United States Patent
Mauro et al.

(10) Patent No.: US 8,909,536 B2
(45) Date of Patent: Dec. 9, 2014

(54) METHODS AND SYSTEMS FOR SPEECH-ENABLING A HUMAN-TO-MACHINE INTERFACE

(75) Inventors: David Andrew Mauro, Montreal (CA); Henri Bouvier, Montreal (CA)

(73) Assignee: Nuance Communications, Inc., Burlington, MA (US)

( * ) Notice: Subject to any disclaimer, the term of this patent is extended or adjusted under 35 U.S.C. 154(b) by 224 days.

(21) Appl. No.: 13/452,557

(22) Filed: Apr. 20, 2012

(65) Prior Publication Data

US 2013/0282381 A1    Oct. 24, 2013

(51) Int. Cl.
*G06F 3/16*    (2006.01)
(52) U.S. Cl.
USPC ........................................... 704/275
(58) Field of Classification Search
USPC ........................................... 704/275
See application file for complete search history.

(56) References Cited

U.S. PATENT DOCUMENTS 7,546,382 B2 *   6/2009   Healey et al. ................. 709/246

* cited by examiner

*Primary Examiner* — Susan McFadden
(74) *Attorney, Agent, or Firm* — Hamilton, Brook, Smith & Reynolds, P.C.

(57) ABSTRACT

Generally, human-to-machine interfaces are configured to accept speech input from a user. However, such interfaces, e.g., web browsers, must be configured to enable acceptance of speech input from the user. Some interfaces, such as mobile browsers, have less configuration adaptability and are not able to be configured to accept speech input from a user. Embodiments of the present invention speech-enable human-to-machine interfaces by loading content of the human-to-machine interface and adding logic configured to enable speech interaction with the content to the interface. The embodiment then activates speech interaction with the content via the logic for the user. Thus, embodiments of the present invention enable speech interaction with interfaces that are not configured to be adapted to allow speech interaction and are able to enable the speech interaction in a seamless manner.

19 Claims, 6 Drawing Sheets

METHODS AND SYSTEMS FOR SPEECH-ENABLING A HUMAN-TO-MACHINE INTERFACE

BACKGROUND OF THE INVENTION

Generally, human-to-machine interfaces allow users to interact with the interfaces via tactile manipulation of input devices (e.g., mouse, keyboard, touch screen, and control panels/buttons). Additionally, some human-to-machine interfaces are configured to accept speech input from a user. For example, a desktop web browser is an example of a human-to-machine interface used to allow a user to interact with content on the Internet. In order for a traditional desktop web browser to accept speech input, the browser must be modified in some way, such as being configured to support a plug-in (i.e., enhancement mechanism) that enables the browser to accept speech input from the user.

SUMMARY OF THE INVENTION

An embodiment of the present invention relates to speech-enabling a human-to-machine interface. The embodiment loads content of the human-to-machine interface. For instance, the human-to-machine interface may be a webpage of a website, and the embodiment may load, for example, interactive elements, text elements and graphical elements (e.g., content of the human-to-machine interface) onto a web browser used to display webpages of a website. The embodiment then adds logic that is configured to enable speech interaction with the content to the interface. For example, the logic may be appended to the interface. The embodiment then presents the content to a user of the interface and activates speech interaction with the content via the logic for the user.

In addition, the embodiment may uniquely identify a plurality of input fields and corresponding input field identifications (IDs) associated with the content of the interface. Further, the embodiment may map the input field IDs to grammar slot names to produce a speech-to-field mapping. The grammar slot names may be associated with speech-to-text synthesis of speech expected to be received by the logic. The embodiment may then output representations of the speech having correspondence with the grammar slot names and enable a flow of representations of speech to the input fields via the speech-to-field mapping.

The embodiment may also parse code associated with the content, where the code, when executed by a processor associated with the interface, causes the interface to present the input fields to a user. The embodiment may then use results of the parsing, to identify input fields uniquely, wherein the results of the parsing include the input fields and corresponding input field IDs.

Further, the embodiment may map the input field IDs to the grammar slot names by determining keywords from the input field IDs and matching the keywords determined with keywords associated with the grammar slot names. The embodiment may also map the input field IDs to the grammar slot names based on user selection of at least a subset of the plurality of input fields. The embodiment may also map the grammar slot names by associating the corresponding input field ID(s) with the grammar slot name responsive to speech received subsequent to the user selection.

The embodiment may also prompt a user for voice input for a specific input field and then correlate the corresponding field ID of the specific input field with the grammar slot name corresponding to speech received subsequent to the user selection. The embodiment may further prompt the user for speech with representations of values provided therein to be applied to a specific input field of the plurality of input fields.

Additionally, the embodiment may prompt the user for speech by performing at least one of the following actions: highlighting the specific input field, changing a state of a textual display presented via the interface, and presenting an audio indication for speech associated with a specific input field. Further, the embodiment may prompt the user for speech by prompting the user for speech relating to multiple input fields of the plurality of input fields.

The embodiment may also enable speech interaction with the input fields, where the input fields include interactive elements displayed on a screen view. The input elements may include at least one of the following input field structures: radio buttons, text fields, virtual buttons, and drop down menus.

The human-to-machine interface may include at least one of the following: a webpage, interactive software program, computerized input form, graphical user interface, visual display, or audio interface.

Further, the embodiment may identify the input fields uniquely and corresponding input field IDs by inspecting the human-to-machine interface for human interactive elements, where the human interactive elements are identified as input fields and corresponding IDs associated with the human interactive elements.

The embodiment may automatically or dynamically construct a speech recognition vocabulary based on input field names or input field values associated with the input fields and associate values of the speech recognition vocabulary with input field IDs. Further, the embodiment may map the input field IDs to grammar slot names by mapping the values of the speech recognition vocabulary with the grammar slot names via the input field IDs.

In addition, the embodiment may construct the speech recognition vocabulary by inspecting the human-to-machine interface for speech expected to be received by the speech-to-text synthesizer. The embodiment may then store representations of the speech, expected to be received, in a data store.

The embodiment may also accept speech as input, provide the speech to a speech-to-text synthesizer to obtain representations of the speech, and insert the representations into input fields via the speech-to-field mappings.

It should be understood that embodiments of the present invention can be implemented in the form of a method, system, or computer readable medium with program codes embodied thereon, for facilitating communications for a user transaction. For ease of reading, the term "system" is used in various portions of the description and may represent some or all forms of embodiments and implementations of the present invention, such as systems, methods, apparatuses, devices, computer readable media, network nodes, and networks.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Generally, human-to-machine interfaces area may be configured to accept speech input from a user. However, traditional interfaces, e.g., web browsers, must be configured to support Flash® or plug-ins that enable the browsers to accept speech input from the user. Interfaces (e.g., browsers) that are not configured to support Flash® or plug-ins, such as mobile browsers, are not able to accept speech input from a user. Embodiments of the present invention speech-enable human-to-machine interfaces by loading content of the human-to-machine interface and adding logic configured to enable speech interaction with the content to the interface. The embodiment then activates speech interaction with the content via the logic for the user. Thus, embodiments of the present invention enable speech interaction with interfaces that are not configured to be adapted to allow speech interaction.

It should be noted that voice input may also include speech input. Both voice input and speech input may arise out of an utterance (e.g., spoken input from a user). An utterance may be a single word, entire phrase, sentence, or even several sentences. It should be further noted that the terms "voice input" and "speech input" may be used interchangeably herein, and in either case, the broadest meanings are intended.

Figure 1:
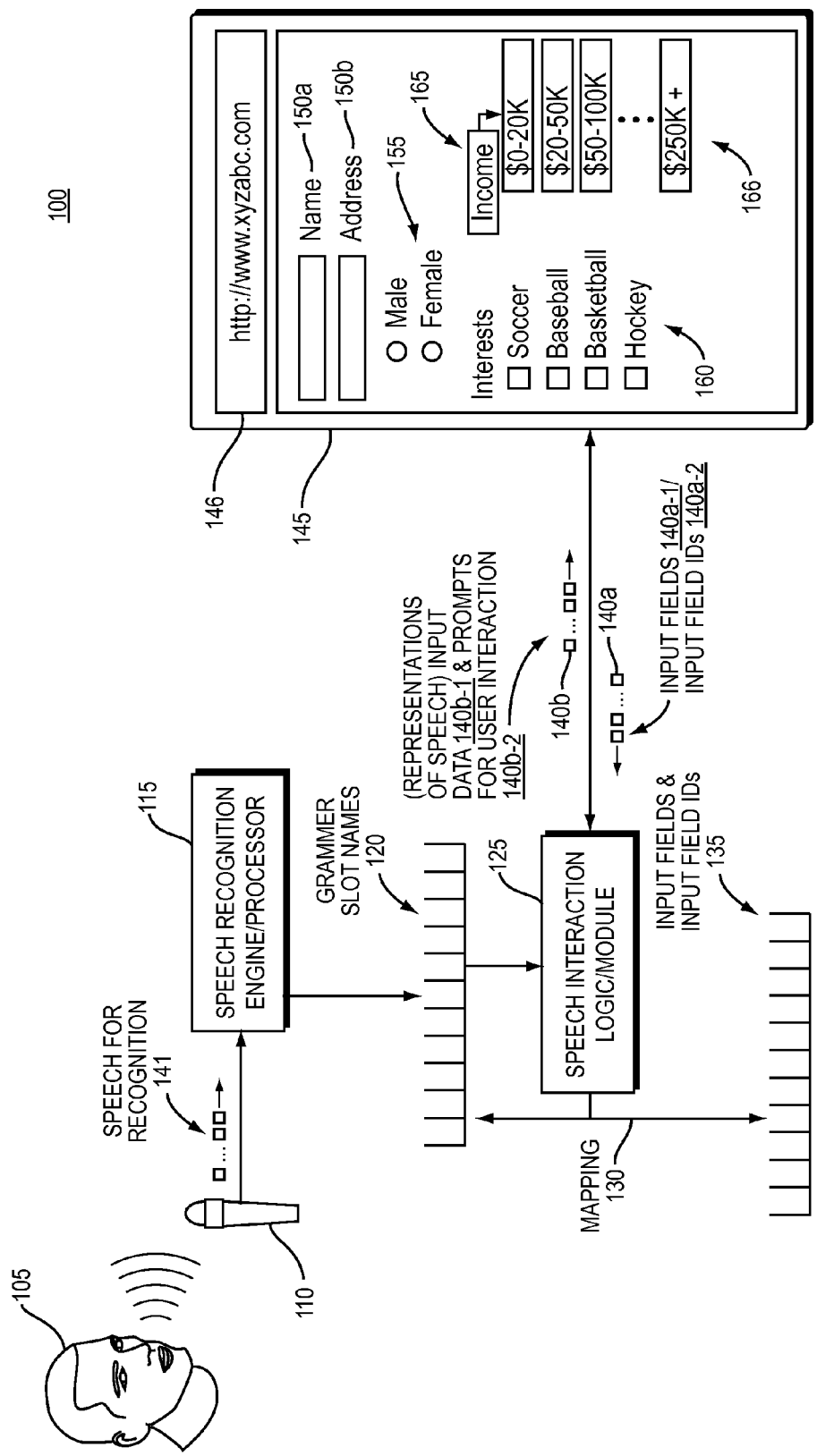
FIG. 1 is a communications diagram illustrating a speech interaction module for speech-enabling a human-to-machine interface in accordance with an example embodiment of the present invention.

FIG. 1 is a communications diagram illustrating a speech interaction module 125 for speech-enabling a human-to-machine interface 145 in accordance with an example embodiment of the present invention.

In the diagram, a user 105 may be interacting with a website 146 via a human-to-machine interface 145 (e.g., web browser). The website may include several webpages, where at least a subset of the webpages of the website may require the user 105 to interact with the webpage. The user 105 may interact with the webpage via the human-to-machine interface using typical peripheral devices, such as a keyboard, mouse, or touch screen. As stated above, embodiments of the present invention enable speech interaction with content (e.g., webpages of a website) via the interface 145.

For example, embodiments of the present invention utilize a speech interaction logic/module 125 to enable speech interaction with content via the interface 145. The speech interaction module 125 receives speech input via a speech recognition engine/processor 115 that matches speech input via a microphone 110 from the user 105 to grammar slot names 120. For instance, the user 105 speaks into a microphone 110, operatively coupled to a conversion module or voice sampling module, that converts speech into data packets 141 and provides the data packets (e.g., speech for recognition) to the speech recognition processor 115. The processor 115 then matches received speech/utterance to grammar slot names to convert audio speech into a textual equivalent.

Contemporaneously, the speech interaction module 125 maps grammar slot names 120, used by the speech recognition processor 115 to convert speech to text, to field identifiers of interactive field of content presented to a user via the human-to-machine interface 145. Using the mapping 130, the speech interaction module 125, is able to take converted speech (e.g., text or any other representation of the speech) and apply the converted speech to the fields of the content presented to the user via the human-to-machine interface 145. In other words, the speech interaction module 125 enables a flow of representations of speech (e.g., text) to the input fields via the speech-to-field mapping 130.

In order to map the grammar slot names 120 to the fields of the content presented to the user, the speech interaction module 125 first uniquely identifies input fields and corresponding input field identifications (IDs) 135 associated with the content presented to the user 105 via the human-to-machine interface 145. For example, the speech interaction module 125 may parse code associated with the content in order to identify input fields uniquely. The code, when executed by a processor associated with the interface 145, may cause the interface to present the content and associated input fields to the user 105. Thus, the speech interaction module 125 may parse the code and identify input fields by identifying metadata that is unique to input fields. For instance, most input fields require input/interaction from the user 105 and may include metadata/flags that signal the interface 145 to enable the user 150 to interact with the fields 135.

Once the speech interaction module 125 identifies the input fields and corresponding input field IDs 135, the speech interaction module 125 is able to map the grammar slot names to the input fields. For example, speech interaction module 125 may complete the mapping by matching keywords extracted from the grammar slot names 120 to keywords extracted from the input fields and corresponding field IDs 135.

In addition, the speech interaction module 125 may notify the user 105 that the content is speech enabled and prompt the user 105 for speech input. For instance, the notification may be presented to the user via a visual prompt on the interface 145 or an audio output via a audio output device associated with the interface 145. The speech interaction module 125 may enable the interface 145 to present prompts the user 105 via communication messages 140b that include prompts for user interaction 140b-2. In addition, the speech interaction module 125 enables the flow of representations of speech (e.g., text) to be inputted into the input fields 135 via the mapping 130 using communication messages 1450b that include input data 140b-1 (e.g., the representations of speech). The input data 140b-1 may include identifies (e.g., mapping information) that enable the interface 145 to enter the input data 140b-1 to the appropriate input fields 135.

The input fields 135 may be interactive elements displayed on a screen via the interface 145 (e.g., web browser) including at least one of the following input field structures: text fields 150a-b, radio buttons 155, check boxes 160, and drop down menus 165 including options 166. Although, several input field structured have been described, it should be known that many other input field structures known or to be known in the art may be implemented with embodiments of the present invention.

Figure 2:
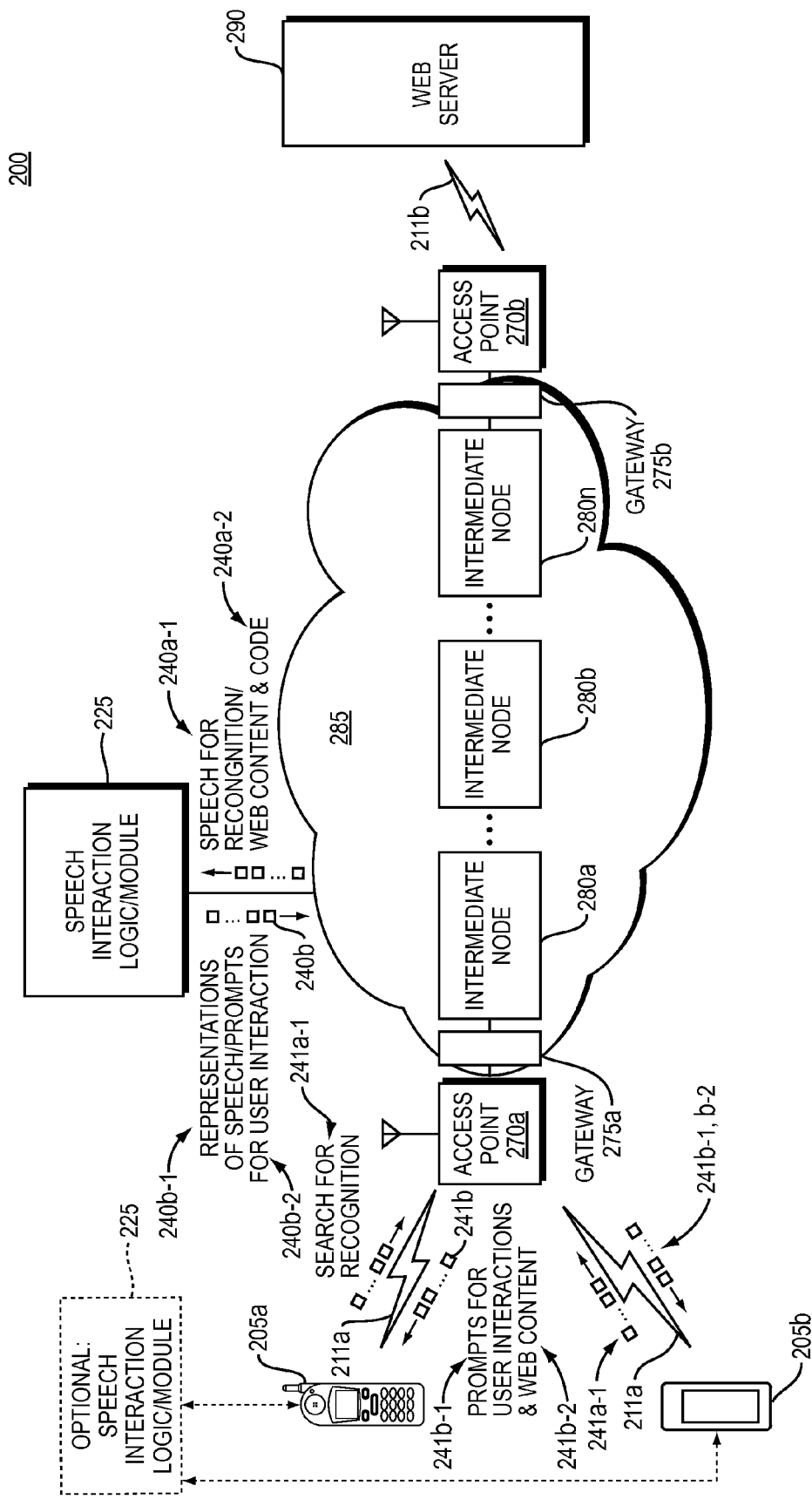
FIG. 2 is a network diagram illustrating a speech interaction module for speech-enabling a human-to-machine interface in accordance with an example embodiment of the present invention.

FIG. 2 is a high-level block diagram of a communications network 100 that may be used within a context of an implementation of the present invention. The communications network 200 includes a collection of communications links interconnecting a plurality of nodes, such as communications units 205*a-b*, access points 270*a-b*, intermediate nodes 280*a-n*, speech interaction module 225, and a web server 290 via a human-to-machine interface (e.g., web browser (not shown)), to form an internetwork of nodes. These internetworked nodes communicate by exchanging data packets according to a pre-defined set of network protocols, such as the Transmission Control Protocol/Internet Protocol (TCP/IP) and the Session Initiation Protocol (SIP). A network protocol as used herein is a formal set of rules that define how data is exchanged between nodes in a communications network.

As will be described in more detail below, the speech interaction module 225 may be employed to improve, customize, or otherwise modify a user's experience with the web server 290. Before describing the speech interaction module 225 in more detail, a description of the communications network 200 is provided. It should be understood that the speech interaction module 225 may be employed in other network topologies or other applications, such as single processor machines.

The intermediate nodes 280*a-n* are typically conventional intermediate nodes, such as routers configured to operate within a communications network 285 (e.g., a Voice Over Internet Protocol (VoIP) network). The access points 270*a-b* contain logic that enable the communications units 205*a-b* to transfer information (e.g., data) via the access points 270*a*, 270*b* to the web server 290 via the intermediate nodes 280*a-n*. To that end, the access points 270*a-b* include circuitry configured to transmit and receive signals (e.g., radio frequency (RF) signals) that carry the information via wireless links 111*a*, 111*b*. Examples of access points 270*a-b* that may be used with the present invention include certain Institute of Electrical and Electronics Engineers (IEEE) 802.11 compliant access points, as well as certain cellular telephone wireless systems that support the transfer of traffic (e.g., data traffic). Other forms of access points now known or hereafter developed are contemplated to be operable with embodiments of the present invention.

The communications units 205*a-b* may be conventional communication units, such as laptop computers, desktop computers, wireless transmit/receive units (WTRUs) (e.g., wireless telephones and personal digital assistants (PDAs)), Internet Protocol (IP) telephones, and the like, that enable audible and/or visual communications to be converted into signals that are transferred to the access points 270*a-b* via the wireless links 211*a*, 211*b*. The access points 270*a-b* interface the communications units 205*a-b* and web server 290 with the network 100 and enable signals to be transferred among the communications units 205*a-b*, web server 290, and the network 285. Specifically, the access points 270*a-b* convert signals, received from the communications units 205*a-b* and web server 290 via the wireless links, 211*a*, 211*b* into data packets (not shown) that are transferred onto the network 200, as well as convert packets received from the network into signals that are transferred to the communications units 205*a-b* and human-to-machine interface 115. Information (e.g., data, voice, or video) is typically conveyed between the communications units 205*a-b* and web server 290. It should be noted that embodiments of the present invention may be adapted to work with fixed as well as mobile devices that are able to communicate via a communications network. These fixed devices may include telephone units, personal computers, and the like that are wired to a network.

As illustrated, the speech interaction module 225 may be located at an intermediate point of the communications network 200 between communication units 205*a-b* and web server 290. Optionally, the speech interaction module 225 may be logically or physically coupled to the communications units 205*a-b* or web server 290.

Figure 3A:
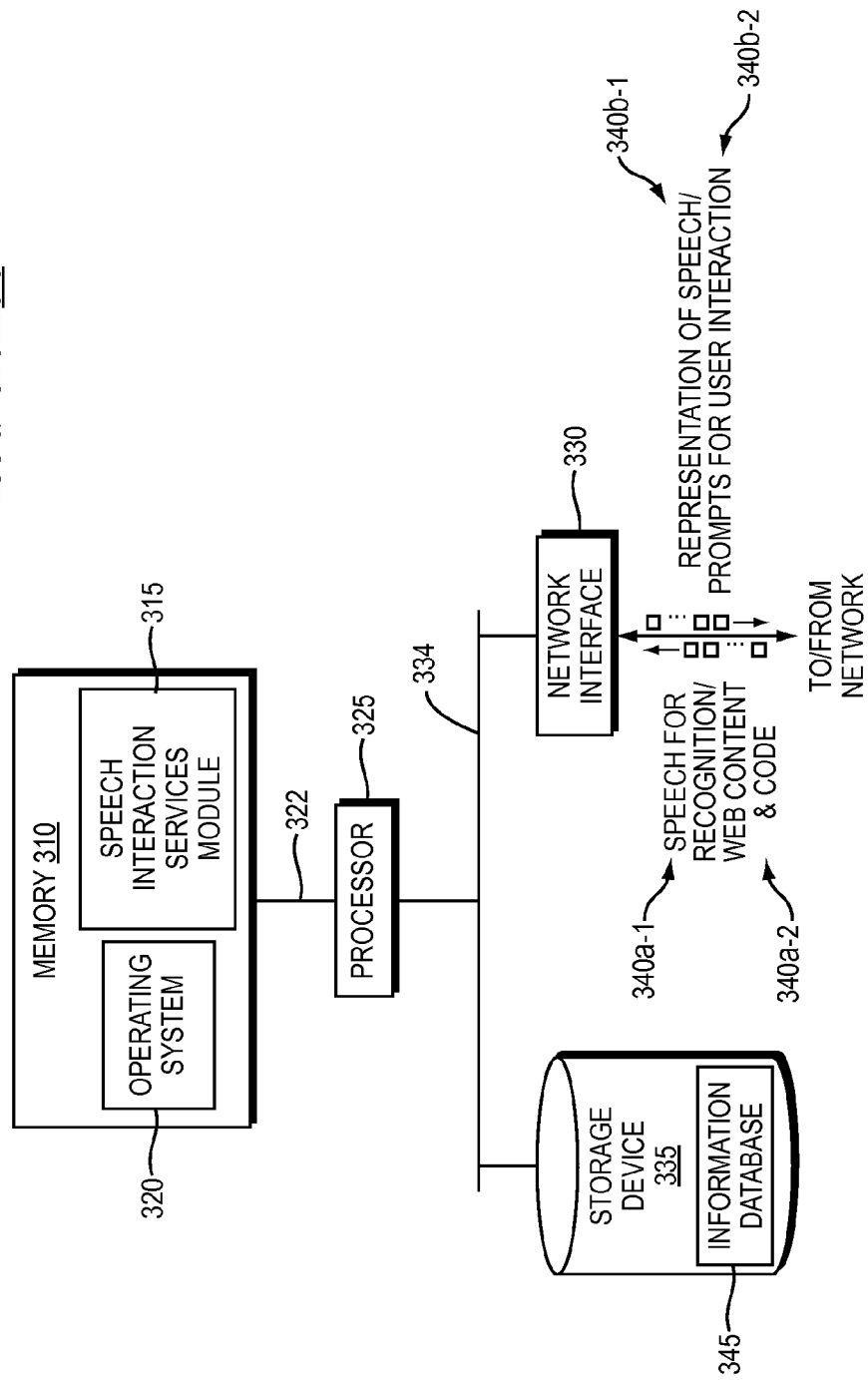
FIG. 3A is block diagram of a speech interaction module in accordance with an example embodiment of the present invention.

FIG. 3A is block diagram of a speech interaction module that may be used in connection with an embodiment of the present invention. The speech interaction module 325 includes a memory 310 coupled to a processor 325 via a memory bus 322, and a storage device 335 and a network interface 330 coupled to the processor 325 via an input/output (I/O) bus 334. It should be noted that speech interaction module 325 may include other devices, such as keyboards, display units and the like. The network interface 330 interfaces the speech interaction module 325 with the network 285 (see FIG. 2) and enables data (e.g., packets to be transferred between the web server 290 (see FIG. 2) and other nodes, such as communications units 205*a-b* and the web server 290 in the network 285. To that end, the network interface 330 may include conventional circuitry that incorporates signal, electrical and mechanical characteristics, and interchange circuits to interface with the physical media of the network 200 and protocols running over that media. The storage device 335 is a conventional storage device (e.g., a disk) capable of storing, inter alia, states of human-to-machine interface, decision tree structures of the states, goal transactions, visual representations of the states, and visual representations of the goal transactions.

The memory 310 is an example of a computer-readable medium, optionally implemented as a RAM employing RAM devices, such as DRAM devices and/or flash memory devices. The memory 310 contains various software and data structures used by the processor 325, such as software and data structures that implement aspects of the present invention. Specifically, the memory 310 may store software configured to serve as an operating system 320 or provide speech interaction services via speech interaction services module 315. The operating system 320 can be used to functionally organize the speech interaction services module 325 by invoking operations in support of software processes and services executing on the speech interaction module 325, such as speech interaction services. The speech interaction services module 315, as will be described below, may include non-transitory computer-executable instructions to facilitate communications for a user transaction by determining goal transactions for a user, constructing and presenting visual representations of the goal transactions, and enabling user interaction with the human-to-machine interface via the visual representations.

The storage device 335 may include an information database 345, which may be implemented in the form of a data structure that is configured to hold various information used to facilitate communications for a user transaction, such as states of a human-to-machine interface, decision tree structures of the states, goal transactions, visual representations of the states, and visual representations of the goal transactions.

Figure 3B:
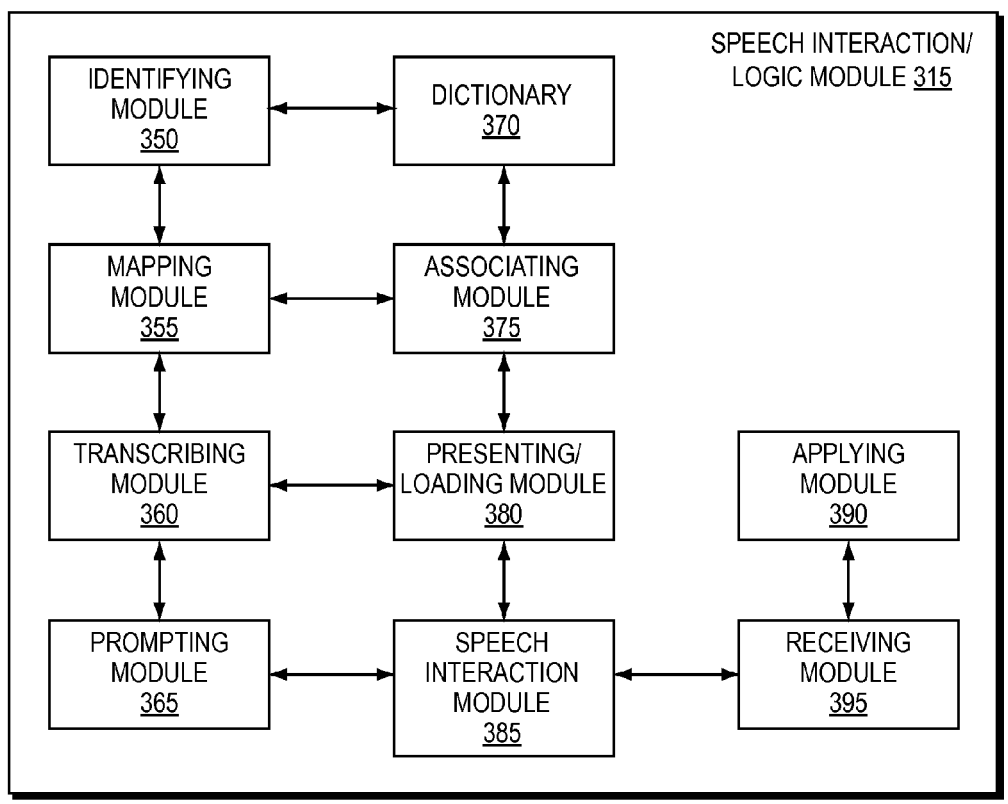
FIG. 3B is a block diagram of a speech interaction services module in accordance with an example embodiment of the present invention.

FIG. 3B is a block diagram of a speech interaction services module 315 that includes an identifying module 350, mapping module 355, transcribing module 360, prompting module 365, dictionary 370, associating module 375, presenting/loading module 380, speech interaction module 385, applying module 390, and receiving module 395.

The presenting/loading module 380 loads content of the human-to-machine interface (e.g. webpages displayed via a web browser) and presents the content to a user. For instance, content may be displayed to the user via a visual display of a communication device 205*a-b* (see FIG. 2). The applying module 390 applies logic to the content and enables the speech interaction module 315 to enable speech interaction with the content via the logic. Further, the speech interaction module 385 activates speech interaction with the content via the logic for the user.

In order to enable speech interaction, the identifying/parsing module 350 uniquely identifies a plurality of input fields and corresponding input field IDs of the content associated with the content. The identifying/parsing module may identify the input fields and corresponding input field IDs by parsing code associated with the content to identify the input fields. In addition, the identifying module 350 passes information associated with the identified input fields to the mapping module 355.

The mapping module 355 maps the identified input fields and input field IDs to grammar slot names used to convert speech input to text. Once the mapping is complete and speech interaction is enabled, the transcribing module 360 enables a flow of representations of speech (e.g., text) to be entered into the input fields via the speech-to-field mappings.

The mapping module 335 may further map the indentified input fields and corresponding input field IDs to the grammar slot names (used to convert speech to text) by determining keywords from the input fields and corresponding input field IDs and match the keywords with keywords associated with the grammar slot names. In addition, the mapping module 35 may dynamically map the field IDs to grammar slot names based on user selection of an input field by associating the corresponding input field ID with the user selected input field with grammar slot names responsive to speech received subsequent to the user selection of the input field. In other words, the mapping module 355 predicts that the speech received by the user subsequent to user selection of an input field is associated with the input field.

Further, the prompting module 365 may prompt the user for voice input for a specific input field and the mapping module 365, receiving information associated with the input field ID of the prompted for input field from the prompting module 365, correlates the corresponding field ID with speech received subsequent to the user selection. Thus, the grammar slot name that is matched with the speech received subsequent to the user selection is mapped to the input field ID of the prompted for input field.

The prompting module 365 may prompt the user for speech input associated with a specific input field by performing at least one of the following example actions: highlight the specific input field, change as state of a textual display presented via the interface, or present an audio indication for speech associated with a specific input field. Many other methods, known in the art or to be known in the art, may b implemented as well. Further, the prompting module 365 may prompt the user for speech relating to multiple input fields of the presented content.

The dictionary module 370 may automatically or dynamically construct a speech recognition vocabulary (e.g., grammar slot names) based on input field names or input field values associated with the input fields. For instance, the dictionary module may extract keywords from the input field and create grammar slot names using the extracted keywords. The associating module 375 may then associate values of the speech recognition vocabulary with input field IDs.

Before any of the above actions may be taken, the receiving module 395 accepts speech and passes the speech to a speech-to-text synthesizer to obtain representations of the received speech (e.g., text). The representations of speech are then matched with grammar slot names, which are mapped to input field via the mapping module 350. The transcribing module 360 then inserts the representations into input fields via the mappings of input field IDs to the grammar slot names.

Figure 4:
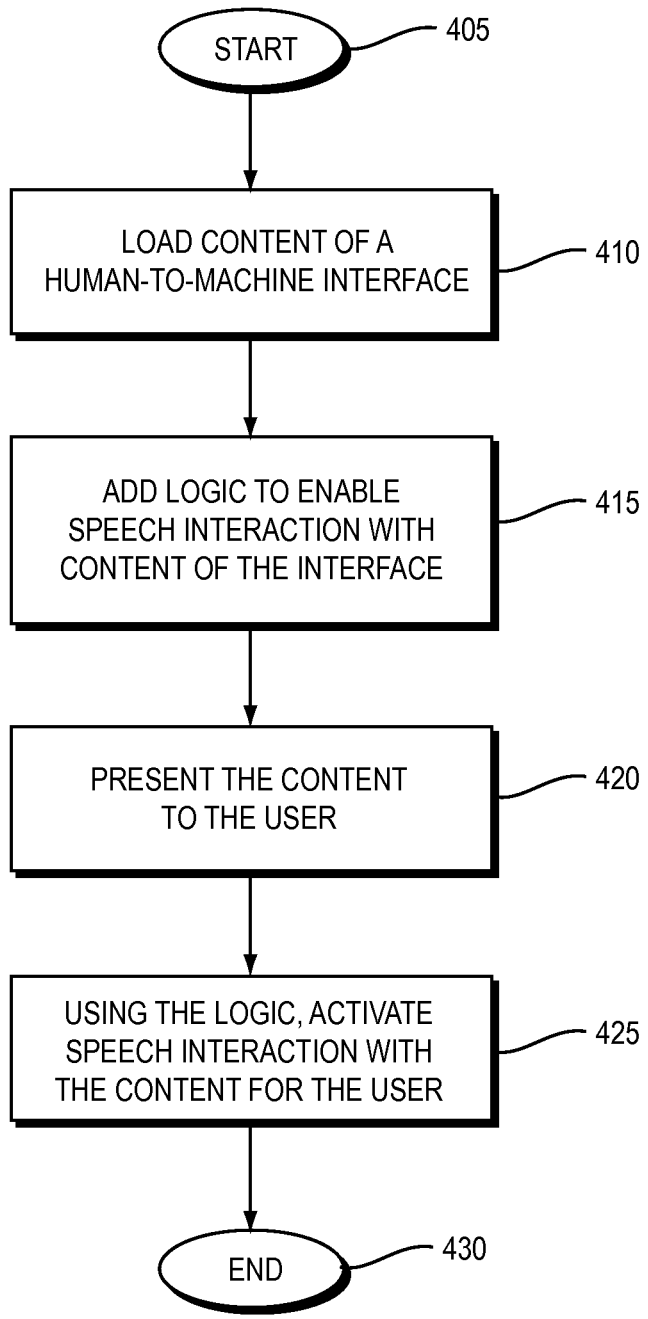
FIG. 4 is a flow diagram of an example method for speech-enabling a human-to-machine interface.

FIG. 4 is a flow diagram of an example method 400 for speech-enabling a human-to-machine interface. The method begins at 405. At 410, the method loads content of a human-to-machine interface to a communication device. The method, at 415, adds logic to the content to enable speech interaction with the content of the interface. Further, the method, at 420, presents the content to the user via a visual display. At 425, the method, using the logic, activates speech interaction with the content for the user. The method 400, at 430, ends.

Figure 5:
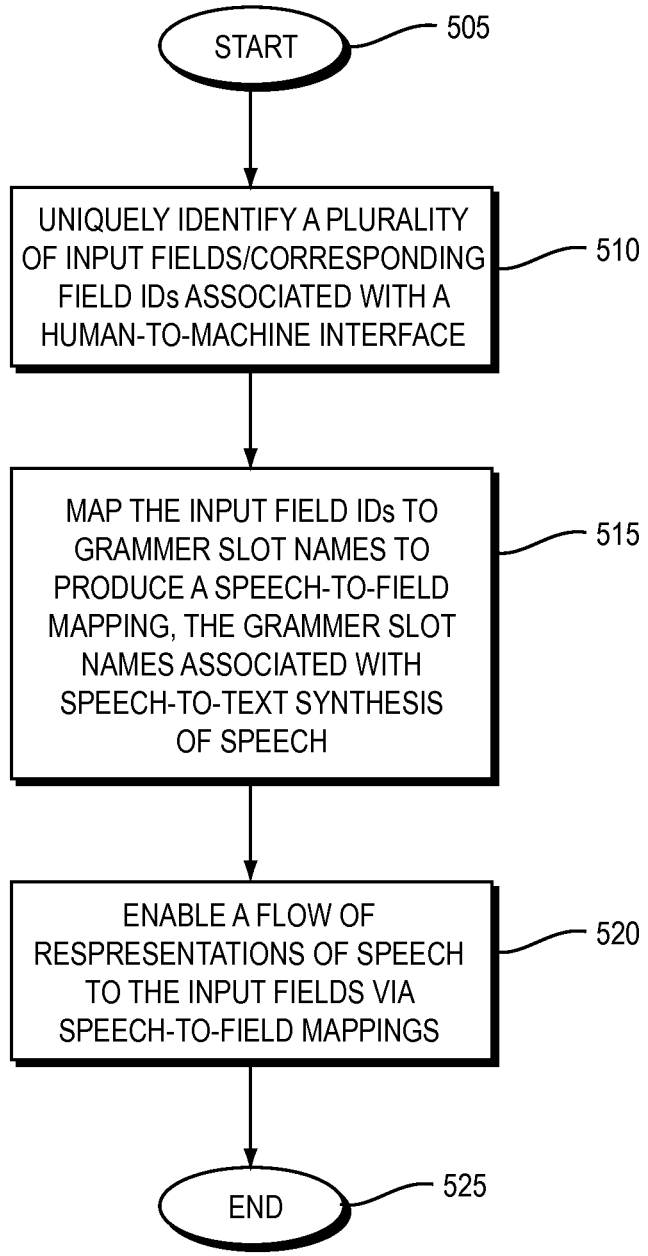
FIG. 5 is a flow diagram of another example method for speech-enabling a human-to-machine interface.

FIG. 5 is a flow diagram of another example method 500 for speech-enabling a human-to-machine interface. The method begins at 505. At 510, the method uniquely identifies a plurality of input fields and corresponding input field identifiers (IDs) associated with a human-to-machine interface. At 515, the method 500 maps the input field IDs to grammar slot names to produce a speech-to-field mapping, where the grammar slot names are associated with speech-to-text synthesis of speech. The method, at 520, then enables a flow of representations of speech to the input fields via the speech-to-field mappings. At 525, method 500 ends.

It should be understood that the block diagrams and flow diagrams presented herein are merely example representations of embodiments. The block diagrams and flow diagrams may include more or fewer blocks or states, have more or fewer interconnections, and the like. Other functions known in the art may be employed and are contemplated to be within the scope of the example embodiments presented herein.

Embodiments or aspects of the invention may be implemented in hardware, firmware, or software. If implemented in software, the software may be implemented in any software language capable of performing the embodiment(s) of the invention. The software may be stored on any non-transient computer-readable medium, such as RAM, ROM, CD-ROM, and so forth. The software includes instructions that can be loaded and executed by a general purpose or application specific processor capable of supporting embodiment(s) of the invention.

While this invention has been particularly shown and described with references to example embodiments thereof, it will be understood by those skilled in the art that various changes in form and details may be made therein without departing from the scope of the invention encompassed by the appended claims.

What is claimed is:

1. A method for speech-enabling a human-to-machine interface, the method comprising:
by a processor,
loading content of the human-to-machine interface;
adding logic configured to enable speech interaction with the content to the interface;
presenting the content to a user of the interface; and
activating speech interaction with the content via the logic for the user;
the logic including:
uniquely identifying a plurality of input fields and corresponding input field identifications (IDs) associated with the content;
mapping the input field IDs to grammar slot names to produce a speech-to-field mapping, the grammar slot names associated with speech-to-text synthesis of speech expected to be received by the logic and outputting representations of the speech having correspondence with the grammar slot names; and
enabling a flow of representations of speech to the input fields via the speech-to-field mapping.

2. The method of claim 1 further comprising enabling speech interaction with the input fields, the input fields including interactive elements displayed on a screen view including at least one of the following input field structures: radio buttons, text fields, buttons, and drop down menus.

3. The method of claim 1 wherein adding the logic includes:
parsing code associated with the content, the code, when executed by a processor associated with the interface, causes the interface to present the input fields to a user; and
using results of the parsing, identifying input fields uniquely, wherein the results of the parsing include the input fields and corresponding input field IDs.

4. The method of claim 1 wherein mapping the input field IDs to the grammar slot names includes determining keywords from the input field IDs and matching the keywords determined with keywords associated with the grammar slot names.

5. The method of claim 1 wherein mapping the input field IDs to the grammar slot names is based on user selection of at least a subset of the plurality of input fields; and wherein mapping further includes associating the corresponding input field ID(s) with the grammar slot name responsive to speech received subsequent to the user selection.

6. The method of claim 1 wherein mapping the input field IDs to the grammar slot further includes:
prompting a user for voice input for a specific input field; and
correlating the corresponding field ID of the specific input field with the grammar slot name corresponding to speech received subsequent to the user selection.

7. The method of claim 1 further comprising prompting the user for speech with representations of values provided therein to be applied to a specific input field of the plurality of input fields.

8. The method of claim 7 wherein prompting the user for speech includes performing at least one of the following actions: highlighting the specific input field, changing a state of a textual display presented via the interface, and presenting an audio indication for speech associated with a specific input field.

9. The method of claim 7 wherein prompting the user for speech includes prompting the user for speech relating to multiple input fields of the plurality of input fields.

10. A system for speech-enabling a human-to-machine interface, the system comprising:
one or more modules implemented in hardware or as instructions executing on a processor, the one or more modules including:
a loading module configured to load content of the human-to-machine interface;
an applying module configured to apply logic to the content, the logic configured to enable speech interaction with the content;
a presenting module configured to present the content to a user of the interface; and
a speech interaction module configured to activate speech interaction with the content via the logic for the user;
the logic including:
an identifying module configured to uniquely identify a plurality of input fields and corresponding input field identifications (IDs) associated with the content;
a mapping module configured to map the input field IDs to grammar slot names to produce a speech-to-field mapping, the grammar slot names associated with speech-to-text synthesis of speech expected to be received by the logic and output representations of the speech having correspondence with the grammar slot names; and
a transcribing module configured to enable a flow of representations of speech to the input fields via the speech-to-field mapping.

11. The system of claim 10 further comprising:
a parsing module configured to parse code associated with the content, the code, when executed by a processor associated with the interface, causes the interface to present the input fields to a user; and
using results from the parsing module, an identifying module configured to identify input fields uniquely, wherein the results of the parsing module include the input fields and corresponding input field IDs.

12. The system of claim 1 wherein the mapping module is further configured to determine keywords from the input field IDs and match the keywords determined with keywords associated with the grammar slot names.

13. The system of claim 1 wherein the mapping module is further configured to map the input field IDs to the grammar slot names is based on user selection of at least a subset of the plurality of input fields and associate the corresponding input field ID(s) with the grammar slot name responsive to speech received subsequent to the user selection.

14. The system of claim 1 further comprising a prompting module configured to:
prompt a user for voice input for a specific input field; and
correlate the corresponding field ID of the specific input field with the grammar slot name corresponding to speech received subsequent to the user selection.

15. The system of claim 10 further comprising a prompting module configured to prompt the user for speech with representations of values provided therein to be applied to a specific input field of the plurality of input fields.

16. The system of claim 15 wherein the prompting module is further configured to prompt the user for speech by performing at least one of the following actions: highlighting the specific input field, changing a state of a textual display presented via the interface, and presenting an audio indication for speech associated with a specific input field.

17. The system of claim 15 wherein the prompting module is further configured to prompt the user for speech includes prompting the user for speech relating to multiple input fields of the plurality of input fields.

18. The system of claim 15 further comprising a speech interaction module configured to enable speech interaction with the input fields, the input fields including interactive elements displayed on a screen view including at least one of the following input field structures: radio buttons, text fields, buttons, and drop down menus.

19. A non-transitory computer readable medium having computer readable program codes embodied therein for speech-enabling a human-to-machine interface, the computer readable program codes including instructions that, when executed by a processor, cause the processor to:
load content of the human-to-machine interface;
apply logic to the content, the logic configured to enable speech interaction with the content;
present the content to a user of the interface; and
activate speech interaction with the content via the logic for the user;
the logic further configured to cause the processor to:
uniquely identify a plurality of input fields and corresponding input field identifications (IDs) associated with the content;

map the input field IDs to grammar slot names to produce a speech-to-field mapping, the grammar slot names associated with speech-to-text synthesis of speech expected to be received by the logic and outputting representations of the speech having correspondence with the grammar slot names; and enable a flow of representations of speech to the input fields via the speech-to-field mapping.

\* \* \* \* \*